(12) United States Patent
Ohyama

(10) Patent No.: US 12,019,614 B2
(45) Date of Patent: Jun. 25, 2024

(54) VERIFICATION METHOD, INFORMATION PROCESSING APPARATUS, AND NON-TRANSITORY COMPUTER-READABLE STORAGE MEDIUM FOR STORING VERIFICATION PROGRAM

(71) Applicant: FUJITSU LIMITED, Kawasaki (JP)

(72) Inventor: Shogo Ohyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 17/502,216

(22) Filed: Oct. 15, 2021

(65) Prior Publication Data

US 2022/0035791 A1    Feb. 3, 2022

Related U.S. Application Data

(63) Continuation of application No. PCT/JP2019/021888, filed on May 31, 2019.

(51) Int. Cl.
*G06F 16/23* (2019.01)
(52) U.S. Cl.
CPC .............. *G06F 16/2365* (2019.01)
(58) Field of Classification Search
None
See application file for complete search history.

(56) References Cited

U.S. PATENT DOCUMENTS 10,585,877 B1 *    3/2020    Casazza ............... G06F 16/80
2006/0242181 A1 *  10/2006   Mueller-Klingspor ..................... G06F 16/86

(Continued)

FOREIGN PATENT DOCUMENTS

CN    102355461      2/2012
JP    H05-134859 A   6/1993
(Continued)

OTHER PUBLICATIONS

University of Rhode Island. "How Computers Work: The CPU and Memory". Apr. 23, 2018 snapshot via Archive.org. URL Link: <https://homepage.cs.uri.edu/faculty/wolfe/book/Readings/Reading04.htm>. Accessed Jun. 2023. (Year: 2018).*

(Continued)

*Primary Examiner* — Irene Baker
(74) *Attorney, Agent, or Firm* — Fujitsu Intellectual Property Center

(57) ABSTRACT

A verification method includes: acquiring, in response to XBRL data, data of an optional title from the XBRL data as target data to be verified; specifying, with reference to definition information of the XBRL data, attribute values assigned to data of the same title as the target data; and verifying validity of the target data by using an algorithm that determines that the target data is valid when the specified attribute values are associated with or not associated with the target data, and determines that the target data is not valid when attribute values other than the specified attribute values are associated with the target data, wherein the verifying is configured to determine that the target data is not valid when the specified attribute values include attribute values of a predetermined type, and none of the attribute values of the predetermined type is associated with the target data.

3 Claims, 14 Drawing Sheets

(56) References Cited

U.S. PATENT DOCUMENTS

| | | | | |
|---|---|---|---|---|
| 2007/0130032 A1* | 6/2007 | Nelson | ............... | G06Q 40/12 |
| | | | | 705/30 |
| 2011/0055055 A1* | 3/2011 | Du | ................... | G06Q 10/10 |
| | | | | 705/30 |
| 2011/0258167 A1 | 10/2011 | Binstock et al. | | |
| 2012/0109698 A1* | 5/2012 | Anderson | ............ | G06Q 10/00 |
| | | | | 705/7.12 |
| 2013/0031117 A1* | 1/2013 | Mandelstein | ........ | G06F 16/214 |
| | | | | 707/758 |
| 2017/0345102 A1 | 11/2017 | Okumura et al. | | |

FOREIGN PATENT DOCUMENTS

| | | |
|---|---|---|
| JP | 2001-306370 A | 11/2001 |
| JP | 2008-134864 A | 6/2008 |
| JP | 2010-146109 A | 7/2010 |
| WO | 2010/070935 A1 | 6/2010 |
| WO | 2016/132550 A1 | 8/2016 |
| WO | 2018/096686 A1 | 5/2018 |

OTHER PUBLICATIONS

International Search Report and Written Opinion of the International Searching Authority (Form PCT/ISA/210, 220, and 237), mailed in connection with PCT/JP2019/021888 and mailed Jul. 2, 2019 (Total 8 pages).

EESR—Extended European Search Report of European Patent Application No. 19930397.5 dated May 12, 2022.

EPOA—Official Communication of European Patent Application No. 19930397.5 dated Feb. 16, 2024 [7 pages].

\* cited by examiner

FIG. 2

| TITLE | AXIS | VALUES THAT AXIS MAY TAKE |
|---|---|---|
| SALES | REGION | ALL REGIONS, NORTH AMERICA, ASIA, EUROPE |
| | PRODUCT TYPE | ALL PRODUCTS, HOME APPLIANCES, PC |
| ASSETS | REGION | ALL REGIONS, NORTH AMERICA, ASIA, EUROPE |
| | ASSET TYPE | TANGIBLE, INTANGIBLE |

FIG. 3

```
<xbrli:context id="Context_Instant_TangibleAsset_NorthAmerica">
  <xbrli:entity>
    <xbrli:identifier scheme="http://test.org">TEST0001</xbrli:identifier>      COMPANY IDENTIFIER, DATE FOR VALUE, AXIS
  </xbrli:entity>                                                               INFORMATION, AND THE LIKE ARE INCLUDED
  <xbrli:period>
    <xbrli:instant>2019-03-31</xbrli:instant>
  </xbrli:period>
  <xbrli:scenario>
    <xbrldi:explicitMember dimension="p0:AssetType">p0:TangibleAsset</xbrldi:explicitMember>      ASSET TYPE: TANGIBLE
    <xbrldi:explicitMember dimension="p0:Region">p0:NorthAmerica</xbrldi:explicitMember>         REGION: NORTH AMERICA
  </xbrli:scenario>
</xbrli:context>
<xbrli:context id="Context_Duration_HouseholdAppliances_NorthAmerica">
  <xbrli:entity>
    <xbrli:identifier scheme="http://test.org">TEST0001</xbrli:identifier>
  </xbrli:entity>
  <xbrli:period>
    <xbrli:startDate>2018-04-01</xbrli:startDate>
    <xbrli:endDate>2019-03-31</xbrli:endDate>
  </xbrli:period>
  <xbrli:scenario>
    <xbrldi:explicitMember dimension="p0:ProductType">p0:HouseholdAppliances</xbrldi:explicitMember>    ASSET TYPE: TANGIBLE
    <xbrldi:explicitMember dimension="p0:Region">p0:NorthAmerica</xbrldi:explicitMember>               REGION: NORTH AMERICA
  </xbrli:scenario>
</xbrli:context>
<xbrli:unit id="JPY">
  <xbrli:measure>iso4217:JPY</xbrli:measure>      UNIT THAT MEANS YEN
</xbrli:unit>
<p0:Assets decimals="0" contextRef="Context_Instant_TangibleAsset_NorthAmerica" unitRef="JPY">100000</p0:Assets>
<p0:Sales decimals="0" contextRef="Context_Duration_HouseholdAppliances_NorthAmerica" unitRef="JPY">100000</p0:Sales>
```

INFORMATION ASSOCIATED WITH VALUE OF TITLE, WHICH IS CALLED CONTEXT

DEFINITION OF ASSETS AND SALES. EACH CONTEXT IS REFERRED TO BY contextRef

| | AXIS OF REGION | | | AXIS OF PRODUCT TYPE | | | AXIS OF ASSET TYPE | | REGION OMITTABLE | PRODUCT TYPE OMITTABLE | ASSET TYPE OMITTABLE |
|---|---|---|---|---|---|---|---|---|---|---|---|
| | ALL REGIONS | NORTH AMERICA | ASIA | EUROPE | ALL PRODUCTS | HOME APPLIANCES | PC | TANGIBLE | INTANGIBLE | | | |
| SALES | 1 | 1 | 1 | 1 | 1 | 1 | 1 | 0 | 0 | 1 | 1 | 1 |
| ASSETS | 1 | 1 | 1 | 1 | 0 | 0 | 0 | 1 | 1 | 1 | 1 | 0 |

FIG. 5

| Combination of values to be verified | All Regions | North America | Asia | Europe | All Products | Home Appliances | PC | Tangible | Intangible | Region Omittable | Product Type Omittable | Asset Type Omittable |
|---|---|---|---|---|---|---|---|---|---|---|---|---|
| ASSETS | | | | | | | | | | | | |
| P1 REGION: ALL REGIONS, OTHERS UNSPECIFIED | 1 | 0 | 0 | 0 | 0 | 0 | 0 | 0 | 0 | 0 | 1 | 1 |
| P2 UNSPECIFIED | 0 | 0 | 0 | 0 | 0 | 0 | 0 | 0 | 0 | 1 | 1 | 1 |
| P3 REGION: NORTH AMERICA, ASSET TYPE: TANGIBLE | 0 | 1 | 0 | 0 | 0 | 0 | 0 | 1 | 0 | 0 | 1 | 0 |

(Axis of Region: All Regions, North America, Asia, Europe; Axis of Product Type: All Products, Home Appliances, PC; Axis of Asset Type: Tangible, Intangible) — 24

FIG. 6

| | | AXIS OF REGION | | | | AXIS OF PRODUCT TYPE | | | | AXIS OF ASSET TYPE | | REGION OMITTABLE | PRODUCT TYPE OMITTABLE | ASSET TYPE OMITTABLE | |
|---|---|---|---|---|---|---|---|---|---|---|---|---|---|---|---|
| | COMBINATION OF VALUES TO BE VERIFIED | ALL REGIONS | NORTH AMERICA | ASIA | EUROPE | ALL PRODUCTS | HOME APPLIANCES | PC | TANGIBLE | INTANGIBLE | | | | | |
| ASSETS | | 1 | 1 | 1 | 1 | 0 | 0 | 0 | 1 | 1 | 1 | 1 | 0 | ~b0 | |
| P1 | REGION: ALL REGIONS, OTHERS UNSPECIFIED | 1 | 0 | 0 | 0 | 0 | 0 | 0 | 0 | 0 | 0 | 1 | 1 | ~b1 | ⎫ NOT MATCH |
| | AND RESULT | 1 | 0 | 0 | 0 | 0 | 0 | 0 | 0 | 0 | 0 | 1 | 0 | ~a1 | ⎭ →NOT VALID |
| P2 | UNSPECIFIED | 0 | 0 | 0 | 0 | 0 | 0 | 0 | 0 | 0 | 1 | 1 | 1 | ~b2 | ⎫ NOT MATCH |
| | AND RESULT | 0 | 0 | 0 | 0 | 0 | 0 | 0 | 0 | 0 | 1 | 1 | 0 | ~a2 | ⎭ →NOT VALID |
| P3 | REGION: NORTH AMERICA, ASSET TYPE: TANGIBLE | 0 | 1 | 0 | 0 | 0 | 0 | 0 | 1 | 0 | 0 | 1 | 0 | ~b3 | ⎫ MATCH |
| | AND RESULT | 0 | 1 | 0 | 0 | 0 | 0 | 0 | 1 | 0 | 0 | 1 | 0 | ~a3 | ⎭ →VALID |

FIG. 12

| | | TOTAL (BUSINESS) | | |
|---|---|---|---|---|
| | | HARDWARE | SOFTWARE | |
| NORTH AMERICA | SALES AMOUNT | 1,000.4 | 2,000.4 | 3,000.8 |
| | COST OF SALES | 800 | 1,600 | 2,400 |
| | GROSS PROFIT | 200 | 400 | 600 |
| EUROPE | SALES AMOUNT | 1,500 | 3,000 | 4,500 |
| | COST OF SALES | 1,200 | 2,400 | 3,600 |
| | GROSS PROFIT | 300 | 600 | 900 |
| ASIA | SALES AMOUNT | 2,000 | 4,000 | 6,000 |
| | COST OF SALES | 1,600 | 3,200 | 4,800 |
| | GROSS PROFIT | 400 | 800 | 1,200 |
| TOTAL (REGION) | SALES AMOUNT | 4,500 | 9,000 | 13,500 |
| | COST OF SALES | 3,600 | 7,200 | 10,800 |
| | GROSS PROFIT | 900 | 1,800 | 2,700 |

FIG. 13A

| TITLE | AXIS OF REGION | | | | AXIS OF PRODUCT TYPE | | | AXIS OF ASSET TYPE | |
|---|---|---|---|---|---|---|---|---|---|
| | ALL REGIONS | NORTH AMERICA | ASIA | EUROPE | ALL PRODUCTS | HOME APPLIANCES | PC | TANGIBLE | INTANGIBLE |
| SALES | 1 | 1 | 1 | 1 | 1 | 1 | 1 | 0 | 0 |
| ASSETS | 1 | 1 | 1 | 1 | 0 | 0 | 0 | 1 | 1 |

FIG. 13B

| TITLE | COMBINATION OF VALUES TO BE VERIFIED | ALL REGIONS | NORTH AMERICA | ASIA | EUROPE | ALL PRODUCTS | HOME APPLIANCES | PC | TANGIBLE | INTANGIBLE |
|---|---|---|---|---|---|---|---|---|---|---|
| SALES | | 1 | 1 | 1 | 1 | 1 | 1 | 1 | 0 | 0 |
| | REGION: NORTH AMERICA, OTHERS UNSPECIFIED | 0 | 1 | 0 | 0 | 0 | 0 | 0 | 0 | 0 |
| | AND RESULT | 0 | 1 | 0 | 0 | 0 | 0 | 0 | 0 | 0 |
| SALES | | 1 | 1 | 1 | 1 | 1 | 1 | 1 | 0 | 0 |
| | ASSETS: TANGIBLE, OTHERS UNSPECIFIED | 0 | 0 | 0 | 0 | 0 | 0 | 0 | 1 | 0 |
| | AND RESULT | 0 | 0 | 0 | 0 | 0 | 0 | 0 | 0 | 0 |
| ASSETS | | 1 | 1 | 1 | 1 | 0 | 0 | 0 | 1 | 0 |
| | REGION: ALL REGIONS, OTHERS UNSPECIFIED | 1 | 0 | 0 | 0 | 0 | 0 | 0 | 0 | 0 |
| | AND RESULT | 1 | 0 | 0 | 0 | 0 | 0 | 0 | 0 | 0 |

(MATCH)

NOT MATCH → NOT VALID

MATCH, BUT NOT VALID

VERIFICATION METHOD, INFORMATION PROCESSING APPARATUS, AND NON-TRANSITORY COMPUTER-READABLE STORAGE MEDIUM FOR STORING VERIFICATION PROGRAM

CROSS-REFERENCE TO RELATED APPLICATION

This application is a continuation application of International Application PCT/JP2019/021888 filed on May 31, 2019 and designated the U.S., the entire contents of which are incorporated herein by reference.

FIELD

The present invention relates to a verification method, and the like.

BACKGROUND

For example, it is obligatory to submit financial statements that use extensible business reporting language (XBRL) to financial supervisory authorities. The XBRL is language developed on the basis of extensible markup language (XML) as data description language for facilitating preparation, distribution, and use of business reports.

The financial statements to be submitted need to conform to a Dimension specification, which is an extended specification used to represent data with a plurality of axes, such as a two-dimensional table. Thus, a financial supervisory authority that has received submission of financial statements verifies the financial statements on the basis of the specification called the Dimension specification.

In the Dimension specification, a combination of an axis and a value specified on the axis is defined in advance. This combination represents a possible value as data. FIG. 12 is a diagram illustrating a reference example of a financial statement conforming to the Dimension specification. In the financial statement illustrated in FIG. 12, axes of "region" and "business" are defined for account titles (hereinafter referred to as titles) of "sales amount", "cost of sales", and "gross profit". On the axis of "region", "North America", "Europe", "Asia", and "total" are defined as values that the axis may take. On the axis of "business", "hardware", "software", and "total" are defined as values that the axis may take.

In addition, in the verification based on the Dimension specification, in a case where there is a combination that is not included in definitions or a combination that is prohibited by the definitions, it is determined that the data is not valid data. Here, for example, in a case where the title is "sales amount", it is determined that a combination of "North America" on the axis of "region" and "hardware" on the axis of "business" is valid data. On the other hand, for example, in a case where the title is "sales amount", it is determined that a combination of "Africa" on the axis of "region" and "middleware" on the axis of "business" is not valid data. This is because "Africa" is not defined as a value that the axis of "region" may take. This is because "middleware" is not defined as a value that the axis of "business" may take.

Examples of the related art include as follows: Japanese Laid-open Patent Publication No. 2001-306370; and Japanese Laid-open Patent Publication No. 5-134859.

SUMMARY OF INVENTION

According to an aspect of the embodiments, a computer implemented verification method includes: acquiring, in response that XBRL data is received, data of an optional title from the XBRL data as target data to be verified; specifying, with reference to definition information of the XBRL data, attribute values assigned to data of the same title as the target data; and verifying validity of the target data by using an algorithm that determines that the target data is valid in a case where the specified attribute values are associated with or not associated with the target data, and determines that the target data is not valid in a case where attribute values other than the specified attribute values are associated with the target data, wherein the verifying of the validity is configured to determine that the target data is not valid in a case where the specified attribute values include attribute values of a predetermined type, and none of the attribute values of the predetermined type is associated with the target data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of definition information;

FIG. 3 is a diagram illustrating an example of an instance;

FIG. 5 is a diagram illustrating an example of a verification bit string according to the embodiment;

FIG. 6 is a diagram illustrating an example of verification processing according to the embodiment;

FIG. 12 is a diagram illustrating a reference example of a financial statement conforming to a Dimension specification;

FIG. 13A is a diagram illustrating a reference example of verification by a bit operation; and FIG. 13B is a diagram illustrating the reference example of the verification by the bit operation.

DESCRIPTION OF EMBODIMENTS

Figure 1:
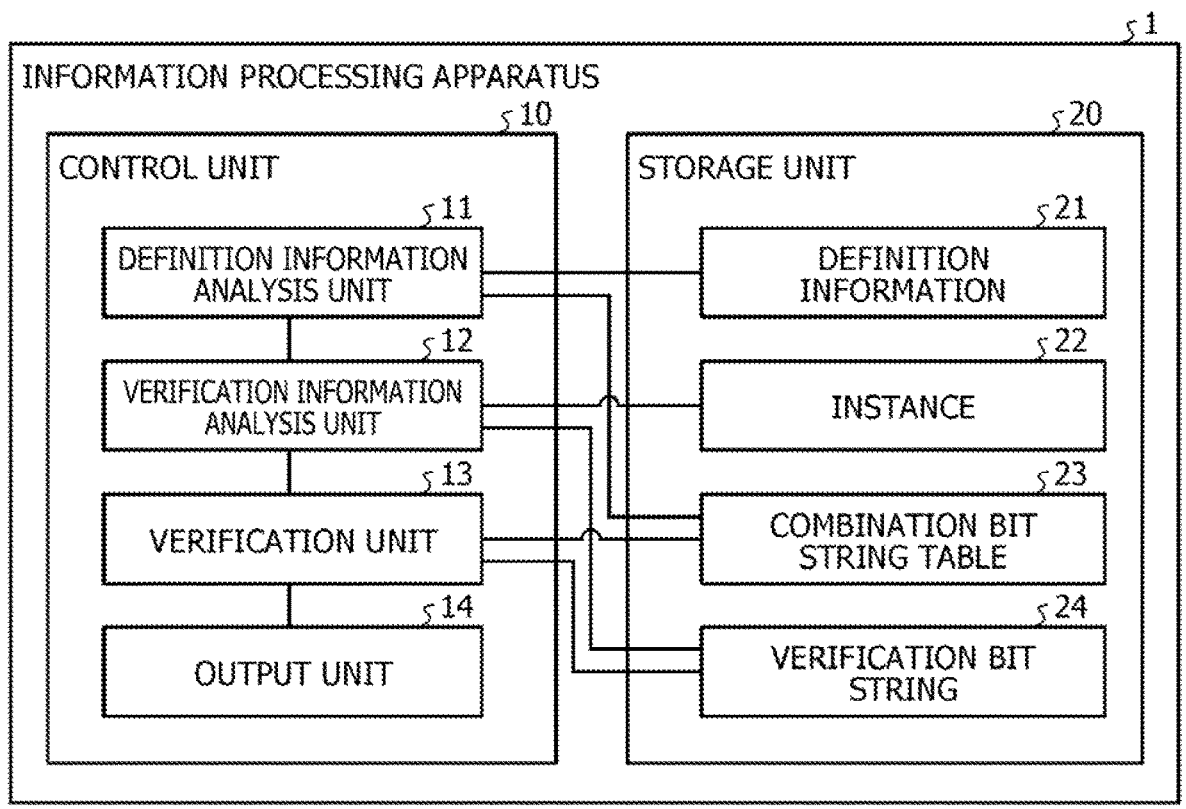
FIG. 1 is a functional block diagram illustrating a configuration of an information processing apparatus according to an embodiment.

In such a Dimension specification, there is a concept of default. The default means a value used in a case where no value is specified on an axis. For example, in a case where the axis is "product type", "all products" is used as a default value. That is, in a case where the title is "sales amount", a sales amount of "North America" and a sales amount of "all products" of "North America" have the same meaning. On the other hand, in the case of an axis for which a default value is not specified, it is needed to always specify a value for this axis.

Therefore, when verification based on the Dimension specification is performed, there is a problem that it is difficult to correctly perform the verification only by a simple combination of an axis and a value on the axis. Note that a similar problem may occur other than the verification based on the Dimension specification.

In one aspect, the present invention aims to improve verification accuracy.

Hereinafter, embodiments of a verification method, an information processing apparatus, and a verification program disclosed in the present application will be described in detail with reference to the drawings. Note that the embodiments do not limit the present invention.

Embodiments

First, a reference example in a case where verification of a combination of an axis and a value on the axis is performed by using a bit operation when verification based on a Dimension specification is performed will be described with reference to FIGS. 13A and 13B. FIGS. 13A and 13B are diagrams illustrating the reference example of the verification by the bit operation. In FIGS. 13A and 13B, a case will be described where the verification of a combination of an axis and a value on the axis in a case where account titles (hereinafter abbreviated as "titles") are "sales" and "assets" is performed.

As illustrated in FIG. 13A, bit strings are generated considering all combinations of axes and values on the axes for "sales" and "assets" as the titles. Here, "all regions", "North America", "Asia", and "Europe" are values on an axis of "region". "All products", "home appliances", and "PC" are values on an axis of "product type". "Tangible" and "intangible" are values on an axis of "asset type".

A bit value of "1" is set in a case where a combination of an axis and a value is possible for a title. A bit value of "0" is set in a case where a combination of an axis and a value is not possible for a title. Here, the bit value of "1" is set for values of the axis of "region" and values of the axis of "product type" for the title of "sales". The bit value of "1" is set for values of the axis of "region" and values of the axis of "asset type" for the title of "Assets". Note that all combinations of axes and values for titles and possible combinations of axes and values for titles are defined in advance in definition information by using the Dimension specification.

Under such circumstances, an information processing apparatus uses a bit operation to verify whether or not a combination of values to be verified is valid on the assumption of the bit strings of the possible combinations of the axes and the values for the titles illustrated in FIG. 13A.

As illustrated in an upper part of FIG. 13B, it is assumed that a combination of values to be verified in a case where the title is "sales" is "region: North America, others unspecified". "Region: North America, others unspecified" means a case where a value on the axis of "region" is specified as "North America" and values on other axes are not specified. In such a case, a bit for "North America" in a bit string for verification is set to "1" as a query bit. For example, in the bit string for verification, only bits of values to be verified are set to "1".

Then, the information processing apparatus performs an AND operation of the bit string of the possible combinations of the axes and the values in the case where the title is "sales" and the bit string for verification of "region: North America, others unspecified", and outputs an AND result. When the AND result matches the query bit, the information processing apparatus determines that the combination is valid. Here, since the AND result matches the query bit, it is determined that the combination of the values to be verified is a valid combination.

As illustrated in a middle part of FIG. 13B, it is assumed that a combination of values to be verified in a case where the title is "sales" is "assets: tangible, others unspecified". "Assets: tangible, others unspecified" means a case where a value on the axis of "asset type" is specified as "tangible" and values on other axes are not specified. In such a case, a bit for "tangible" in a bit string for verification is set to "1" as a query bit.

Then, the information processing apparatus performs an AND operation of the bit string of the possible combinations of the axes and the values in the case where the title is "sales" and the bit string for verification of "region: tangible, others unspecified", and outputs an AND result. When the AND result matches the query bit, the information processing apparatus determines that the combination is valid. Here, since the AND result does not match the query bit, it is determined that the combination of the values to be verified is not a valid combination.

As illustrated in a lower part of FIG. 13B, it is assumed that a combination of values to be verified in a case where the title is "assets" is "region: all regions, others unspecified". "Region: all regions, others unspecified" means a case where a value on the axis of "region" is specified as "all regions" and values on other axes are not specified. In such a case, a bit for "all regions" in a bit string for verification is set to "1" as a query bit.

Then, the information processing apparatus performs an AND operation of the bit string of the possible combinations of the axes and the values in the case where the title is "assets" and the bit string for verification of "region: all regions, others unspecified", and outputs an AND result. When the AND result matches the query bit, the information processing apparatus determines that the combination is valid. Here, since the AND result matches the query bit, it is determined that the combination of the values to be verified is a valid combination.

However, in the case where the title is "assets", a value on the axis of "asset type" needs to be verified from the possible combinations of the axes and the values in the case where the title is "assets" indicated in FIG. 13B. For example, the value on the axis of "asset type" needs to be included in the combination of the values to be verified. However, in the case of the lower part of FIG. 13B, the value on the axis of "asset type" is not included in the combination of the values to be verified. Nevertheless, the AND result matches the query bit, and it is determined that the combination of the values to be verified is a valid combination.

This is because, since the Dimension specification does not define a default value on the axis of "asset type", in a case where a combination of values when the title is "assets" is to be verified, it is always needed to specify a non-default value on the axis of "asset type" in a bit string for verification. However, even though the value on the axis of "asset type" is not specified in the bit string for verification, the result is valid. For example, since the Dimension specification has a concept of default, in the case of an axis that does not have a default for a value, it may be erroneously determined that the combination is valid as in the lower part of FIG. 13B. Thus, when verification based on the Dimension specification is performed, it is difficult to correctly perform the verification only by a simple combination of an axis and a value on the axis.

Therefore, in the following, an information processing apparatus 1 that executes a verification method that improves verification accuracy when verification based on the Dimension specification is performed by a bit operation will be described.

Configuration of Information Processing Apparatus According to Embodiment

FIG. 1 is a functional block diagram illustrating a configuration of the information processing apparatus according to an embodiment. As illustrated in FIG. 1, the information processing apparatus 1 performs verification based on the Dimension specification by a bit operation. The information processing apparatus 1 determines whether or not specification of a value on an axis may be omitted on the basis of possible combinations of axes and values on the axes for a title defined in advance by the Dimension specification. Then, the information processing apparatus 1 adds a discrimination bit to each of a bit string (combination bit string) of the possible combinations of the axes and the values on the axes and a bit string for verification (verification bit string), and performs verification by using the combination bit string and the verification bit string that are obtained by the addition. Note that the bit string for verification is an example of data to be verified. The bit string of the possible combinations of the axes and the values on the axes is an example of combination data.

The information processing apparatus 1 includes a control unit 10 and a storage unit 20.

The control unit 10 includes an internal memory for storing a program prescribing various processing procedures and control data, and executes various types of processing by using the program and the control data. In addition, the control unit 10 corresponds to, for example, an integrated circuit such as an application specific integrated circuit (ASIC) or a field programmable gate array (FPGA) or an electronic circuit such as a central processing unit (CPU) or a micro processing unit (MPU). Moreover, the control unit 10 includes a definition information analysis unit 11, a verification information analysis unit 12, a verification unit 13, and an output unit 14. Note that the verification information analysis unit 12 is an example of an acquisition unit. The verification unit 13 is an example of a specification unit and a verification unit.

The storage unit 20 corresponds to, for example, a storage device such as a non-volatile semiconductor memory element such as a flash memory or Ferroelectric Random Access Memory (FRAM) (registered trademark). In addition, the storage unit 20 includes definition information 21, an instance 22, a combination bit string table 23, and a verification bit string 24.

The definition information 21 is information regarding a definition body of an XBRL element. The definition information 21 is information that defines information needed for electronically representing financial information, such as an account title name and axis information of the XBRL element. The definition information 21 is included in an XBRL taxonomy.

FIG. 2 is a diagram illustrating an example of the definition information. As illustrated in FIG. 2, the definition information 21 stores a title, an axis, and values that the axis may take in association with each other.

As an example, in a case where the title is "sales", "region" and "product type" are included as the axes. In a case where the axis is "region", "all regions", "North America", "Asia", and "Europe" are included as the values that the axis may take. In a case where the axis is "product type", "all products", "home appliances", and "PC" are included as the values that the axis may take. Furthermore, in a case where the title is "assets", "region" and "asset type" are included as the axes. In a case where the axis is "region", "all regions", "North America", "Asia", and "Europe" are included as the values that the axis may take. In a case where the axis is "asset type", "tangible" and "intangible" are included as the values that the axis may take.

Here, "all regions", which is the value that the axes of "region" may take, and "all products", which is the value that the axis of "product type" may take, are default values that the axes may take. Note that, in the axis of "asset type", a default value that the axis may take is not defined.

Returning to FIG. 1, the instance 22 is a document indicating XBRL data describing financial information. The financial information is described according to a rule defined in the XBRL taxonomy.

FIG. 3 is a diagram illustrating an example of the instance. As illustrated in FIG. 3, the instance includes, for example, a company identifier, a date for a value, axis information as information associated with a value of a title, and the like. The information associated with the value of the title is called "context". The context represents data of the XBRL element by Identifier, Period, Segment, and Scenario. For example, the XBRL element may be interpreted by Identifier, Period, Segment, and Scenario. As an example, a value of "tangible" is set on the axis of "asset type". A value of "North America" is set on the axis of "region".

Returning to FIG. 1, the combination bit string table 23 stores, for each title, a bit string of possible combinations of axes and values on the axes. The combination bit string is a bit string considering all combinations of axes and values of the axis for all axes defined in the definition information 21. In addition, the combination bit string has a bit indicating whether omission is possible or not possible for each axis. Note that the combination bit string table 23 is generated by the definition information analysis unit 11.

Figure 4:
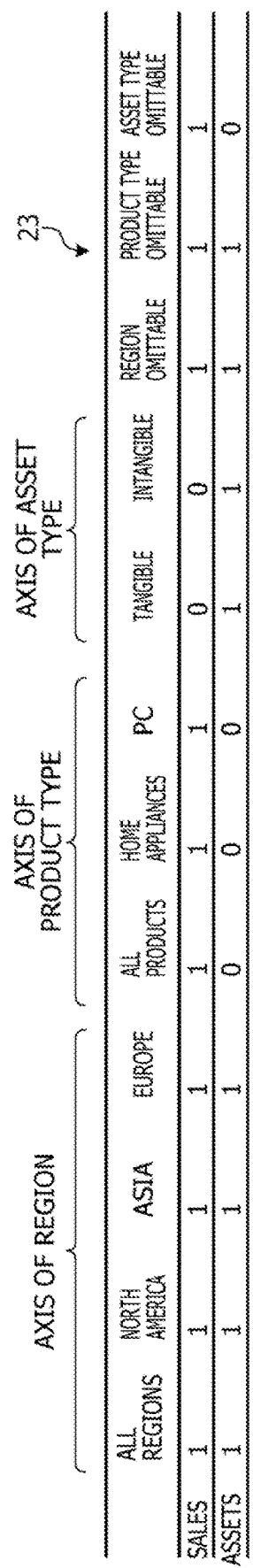
FIG. 4 is a diagram illustrating an example of a combination bit string table according to the embodiment.

Here, an example of the combination bit string table 23 according to the embodiment will be described with reference to FIG. 4. FIG. 4 is a diagram illustrating an example of the combination bit string table according to the embodiment. As illustrated in FIG. 4, the combination bit string table 23 associates, for each title, information for a value on an axis with information indicating whether omission for an axis is possible.

The information for a value on an axis is information indicating whether or not the value on the axis is specified in a title, and is represented by a bit. As an example, "1" is set in a case where a value on an axis is specified in a title, and "0" is set in a case where a value on an axis is not specified in a title. Whether omission for an axis is possible is information indicating whether the axis has a default value or indicating that the axis is not specified in a title, and is represented by a bit. As an example, "1" is set in a case where an axis has a default value or the axis is not set in a title, and "0" is set in a case where an axis is set in a title and the axis does not have a default value.

As an example, in a case where the title is "sales", in each of values on an axis of "region", which are "all regions", "North America", "Asia", and "Europe", "1" indicating that the value on the axis specified in the title is stored. In each of values on an axis of "product type", which are "all products", "home appliances", and "PC", "1" indicating that the value on the axis is specified in the title is stored. In each of values on an axis of "asset type", which are "tangible" and "intangible", "0" indicating that the value on the axis is not specified in the title is stored. In "region" omittable, "1" indicating that the axis of "region" has a default value is stored. In "product type" omittable, "1" indicating that the axis of "product type" has a default value is stored. In "asset type" omittable, "1" indicating that the axis of "asset type" is not set in the title is stored.

As another example, in a case where the title is "assets", in each of values on the axis of "region", which are "all regions", "North America", "Asia", and "Europe", "1" indicating that the value on the axis is specified in the title is stored. In each of values on the axis of "product type", which are "all products", "home appliances", and "PC", "0" indicating that the value on the axis is not specified in the title is stored. In each of values on the axis of "asset type", which are "tangible" and "intangible", "1" indicating that the value on the axis is specified in the title is stored. In "region" omittable, "1" indicating that the axis of "region" has a default value is stored. In "product type" omittable, "1" indicating that the axis of "product type" is not set in the title is stored. In "asset type" omittable, "0" indicating that the axis of "asset type" is set in the title and the axis does not have a default value is stored.

Returning to FIG. 1, the verification bit string 24 is a bit string used for verification of whether or not a combination of values to be verified is valid for a title to be verified. In addition, the verification bit string 24 has a bit indicating that specification is omitted for an axis having a value not to be verified. Note that the verification bit string 24 is generated by the verification information analysis unit 12.

Here, an example of the verification bit string 24 according to the embodiment will be described with reference to FIG. 5. FIG. 5 is a diagram illustrating an example of the verification bit string according to the embodiment. As illustrated in FIG. 5, the verification bit string 24 associates, for a title, information for a value on an axis with information indicating whether omission for an axis is possible.

The information for a value on an axis is information indicating whether or not the value on the axis is specified in a combination of values to be verified, and is represented by a bit. As an example, "1" is set in a case where a value on an axis is specified in a combination of values to be verified, and "0" is set in a case where a value on an axis is not specified in a combination of values to be verified. Whether omission for an axis is possible is information indicating that specification is omitted for an axis having a value not specified in a combination of values to be verified, and is represented by a bit. As an example, "1" is set in a case where specification is omitted, and "0" is set in a case where specification is not omitted.

As an example (P1), a combination of values to be verified in a case where the title is "assets" is "region: all regions, others unspecified". "Region: all regions, others unspecified" means a case where a value on the axis of "region" is specified as "all regions" and values on other axes are not specified. In such a case, "1" as a query bit is stored in a bit for "all regions" of the verification bit string 24. In addition, in "product type" omittable in the verification bit string 24, "1" indicating that specification is omitted is stored. In addition, in "asset type" omittable in the verification bit string 24, "1" indicating that specification is omitted is stored. Note that, in "region" omittable in the verification bit string 24, "0" indicating that specification is not omitted is stored.

As another example (P2), a combination of values to be verified in a case where the title is "assets" is "region: unspecified". "Region: unspecified" means a case where values on all axes are not specified. In such a case, "0" indicating that there is no query is stored in bits for the values on all the axes of the verification bit string 24. In addition, in "region" omittable in the verification bit string 24, "1" indicating that specification is omitted is stored. In "product type" omittable in the verification bit string 24, "1" indicating that specification is omitted is stored. In addition, in "asset type" omittable in the verification bit string 24, "1" indicating that specification is omitted is stored.

As another example (P3), a combination of values to be verified in a case where the title is "assets" is "region: North America, asset type: tangible". "Region: North America, asset type: tangible" means a case where a value on the axis of "region" is specified as "North America" and a value on "asset type" is specified as "tangible". In such a case, "1" as a query bit is stored in a bit for "North America" of the verification bit string 24. "1" as a query bit is stored in a bit for "tangible" of the verification bit string 24. In addition, in "product type" omittable in the verification bit string 24, "1" indicating that specification is omitted is stored. Note that, in "region" omittable in the verification bit string 24, "0" indicating that specification is not omitted is stored. In "asset type" omittable in the verification bit string 24, "0" indicating that specification is not omitted is stored.

Returning to FIG. 1, the definition information analysis unit 11 analyzes the definition information 21 and generates the combination bit string table 23.

For example, the definition information analysis unit 11 refers to the definition information 21 to acquire all combinations of axes and values on the axis, and saves the combinations in a list. The definition information analysis unit 11 adds an item of omittable for each axis to an end of the list. The definition information analysis unit 11 uses the list to generate combination bit strings based on all titles. As an example, the definition information analysis unit 11 performs the following processing for each title. The definition information analysis unit 11 refers to the definition information 21 and sets a combination part of the list corresponding to a combination of an axis based on a title and a value on the axis to "1", to generate a combination bit string. In addition, in a case where there is an axis that is not based on a title, for example, an axis that is not specified in a title, the definition information analysis unit 11 sets an omittable bit for this axis to "1". Moreover, in a case where a default value is specified on an axis based on a title, the definition information analysis unit 11 sets an omittable bit for this axis to "1". Note that, in a case where a default value is not specified on an axis based on a title, the definition information analysis unit 11 leaves an omittable bit for this axis as "0". Then, the definition information analysis unit 11 adds a combination bit string for each title to the combination bit string table 23.

The verification information analysis unit 12 analyzes verification information to be verified to generate the verification bit string 24.

For example, when receiving the instance 22 which is XBRL data to be verified, the verification information analysis unit 12 acquires, from the instance 22, data of an optional title as data to be verified. The verification information analysis unit 12 generates the verification bit string 24 from the data to be verified. As an example, the verification information analysis unit 12 acquires an axis desired to be verified from the data to be verified, and checks whether or not a plurality of values is specified on the same axis. In a case where a plurality of values is not specified on the same axis, the verification information analysis unit 12 sets a combination part of the list corresponding to a combination of the axis desired to be verified and a value on the axis to "1", and generates the verification bit string 24. In addition, the verification information analysis unit 12 sets "1" in an item of omittable in the verification bit string 24 for an axis not to be verified, for example, an axis not specified in the data to be verified. Note that the verification information analysis unit 12 leaves an omittable bit for this axis as "0" for the axis desired to be verified, for example, the axis specified in the data to be verified.

The verification unit 13 verifies verification information to be verified.

For example, the verification unit 13 acquires a combination bit string of a title to be verified from the combination bit string table 23. The verification unit 13 performs an AND operation of the verification bit string 24 and the acquired combination bit string. Then, in a case where an AND result matches the verification bit string 24, the verification unit 13 determines that the verification information is valid. In a case where the AND result does not match the verification bit string 24, the verification unit 13 determines that the verification information is not valid.

For example, the verification unit 13 refers to the definition information 21 to specify an axis and a value on the axis (corresponding to a combination bit string) assigned to data of the same title as data to be verified (corresponding to the verification bit string 24). The verification unit 13 determines that the data to be verified is valid in a case where the specified axis and value on the axis are specified or not specified in the data to be verified, and determines that the data to be verified is not valid in a case where an axis and value on the axis other than the specified axis and value on the axis are specified in the data to be verified. Then, the verification unit 13 determines that the data to be verified is not valid in a case where the specified axis and value on the axis include an axis of a predetermined type and a value on the axis, and neither the axis of the predetermined type nor the value on the axis is specified in the data to be verified. Here, the predetermined type means, for example, a type indicating an axis having no default (axis of asset type) indicated in FIG. 5.

The output unit 14 outputs a verification result of verification information to be verified. For example, the output unit 14 outputs, to a monitor, the verification bit string 24, a combination bit string of a title to be verified, and a verification result.

One Example of Verification Processing

FIG. 6 is a diagram illustrating an example of verification processing according to the embodiment. In FIG. 6, a case will be described where a title is "assets" and verification of the combinations of the values to be verified in P1 to P3 indicated in FIG. 5 is performed. A bit string indicated by a reference sign b0 in FIG. 6 is a combination bit string in a case where the title is "assets". In the combination bit string b0, "1" indicating that values on the axis of "region" are specified in the title is set. "1" indicating that values on the axis of "asset type" are specified in the title is set. In addition, an omittable bit of "region" is set to "1" indicating that the axis of "region" has a default value ("all ranges"). An omittable bit of "product type" is set to "1" indicating that the axis of "product type" is not set in the title. An omittable bit of "asset type" is set to "0" indicating that the axis of "asset type" is set in the title and the axis does not have a default value.

Under such circumstances, verification of the combination of the values to be verified in P1 will be described. The combination of the values to be verified in P1 is "region: all regions, others unspecified". Here, a bit string indicated by a reference sign b1 in FIG. 6 is the verification bit string 24 of the combination of the values to be verified in P1. A query bit "1" is set in a bit for "all regions" in the verification bit string 24. In "region" omittable, "0" indicating that specification is not omitted is set. In "product type" omittable, "1" indicating that specification is omitted is set. In "asset type" omittable, "1" indicating that specification is omitted is set.

For example, the verification unit 13 performs an AND operation of a verification bit string 24 (b1) and the combination bit string b0. Then, in a case where an AND result a1 matches the verification bit string 24 (b1), the verification unit 13 determines that the combination of the values to be verified in P1 is valid. In a case where the AND result a1 does not match the verification bit string 24 (b1), the verification unit 13 determines that the combination of the values to be verified in P1 is not valid. Here, since the AND result a1 does not match the verification bit string 24 (b1), it is determined that the combination of the values to be verified in P1 is not valid. For example, in a case where the title is "assets", a value on the axis of "asset type" that does not have a default value has to be specified. However, since the value on the axis of "asset type" is not specified in the combination of the values to be verified in P1, it is determined that the combination of the values to be verified in P1 is not valid. With this configuration, since an AND result does not match a verification bit by addition of an omittable bit for each axis to the combination bit string and the verification bit string 24, the verification unit 13 may determine that verification determined to be valid conventionally is not valid.

Next, verification of the combination of the values to be verified in P2 will be described. The combination of the values to be verified in P2 is "unspecified". Here, a bit string indicated by a reference sign b2 in FIG. 6 is the verification bit string 24 of the combination of the values to be verified in P2. In each of "region" omittable, "product type" omittable, and "asset type" omittable in the verification bit string 24, "1" indicating that specification is omitted is set.

For example, the verification unit 13 performs an AND operation of a verification bit string 24 (b2) and the combination bit string b0. Then, in a case where an AND result a2 matches the verification bit string 24 (b2), the verification unit 13 determines that the combination of the values to be verified in P2 is valid. In a case where the AND result a2 does not match the verification bit string 24 (b2), the verification unit 13 determines that the combination of the values to be verified in P2 is not valid. Here, since the AND result a2 does not match the verification bit string 24 (b2), it is determined that the combination of the values to be verified in P2 is not valid. For example, in a case where the title is "assets", a value on the axis of "asset type" that does not have a default value has to be specified. However, since the value on the axis of "asset type" is not specified in the combination of the values to be verified in P2, it is determined that the combination of the values to be verified in P2 is not valid. With this configuration, since an AND result does not match a verification bit by addition of an omittable bit for each axis to the combination bit string and the verification bit string 24, the verification unit 13 may determine that verification determined to be valid conventionally is not valid.

Next, verification of the combination of the values to be verified in P3 will be described. The combination of the values to be verified in P3 is "region: North America, asset type: tangible". Here, a bit string indicated by a reference sign b3 in FIG. 6 is the verification bit string 24 of the combination of the values to be verified in P3. A query bit "1" is set in a bit for "North America" in the verification bit string 24. A query bit "1" is set in a bit for "tangible". In "region" omittable, "0" indicating that specification is not omitted is set. In "product type" omittable, "1" indicating that specification is omitted is set. In "asset type" omittable, "0" indicating that specification is not omitted is set.

For example, the verification unit 13 performs an AND operation of a verification bit string 24 (b3) and the combination bit string b0. Then, in a case where an AND result a3 matches the verification bit string 24 (b3), the verification unit 13 determines that the combination of the values to be verified in P3 is valid. In a case where the AND result a3 does not match the verification bit string 24 (b3), the verification unit 13 determines that the combination of the values to be verified in P3 is not valid. Here, since the AND result a3 matches the verification bit string 24 (b3), it is determined that the combination of the values to be verified in P3 is valid. For example, since an axis and a value on the axis of the combination indicated by the combination bit string b0 are specified or not specified in the combination of the values to be verified in P3, it is determined that the combination of the values to be verified in P3 is valid.

Flowchart of Verification Processing

Figure 7:
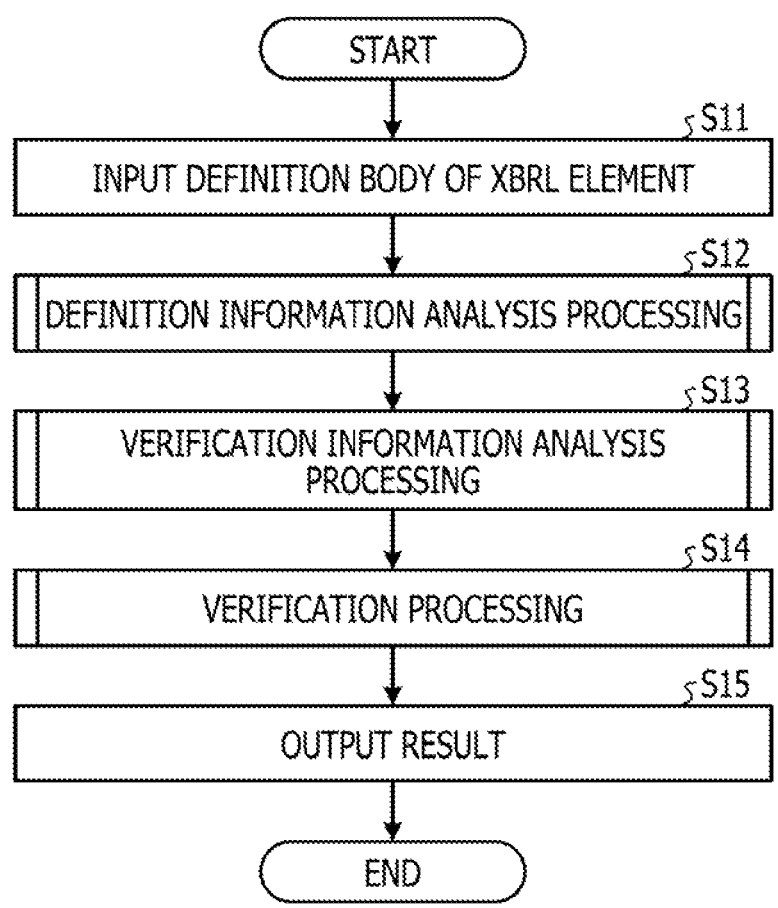
FIG. 7 is a diagram illustrating an example of a main flowchart of the verification processing according to the embodiment.

Here, a flowchart of the verification processing according to the embodiment will be described with reference to FIGS. 7 to 10. FIG. 7 is a diagram illustrating an example of a main flowchart of the verification processing according to the embodiment.

As illustrated in FIG. 7, when a definition body (definition information 21) of an XBRL element is input (Step S11), the definition information analysis unit 11 executes definition information analysis processing (Step S12). Note that a flowchart of the definition information analysis processing will be described later.

Then, the verification information analysis unit 12 executes verification information analysis processing (Step S13). Note that a flowchart of the verification information analysis processing will be described later.

Then, the verification unit 13 executes the verification processing (Step S14). Note that the flowchart of the verification processing will be described later, Then, the output unit 14 outputs a result of the verification processing (Step S15).

Flowchart of Definition Information Analysis Processing

Figure 8:
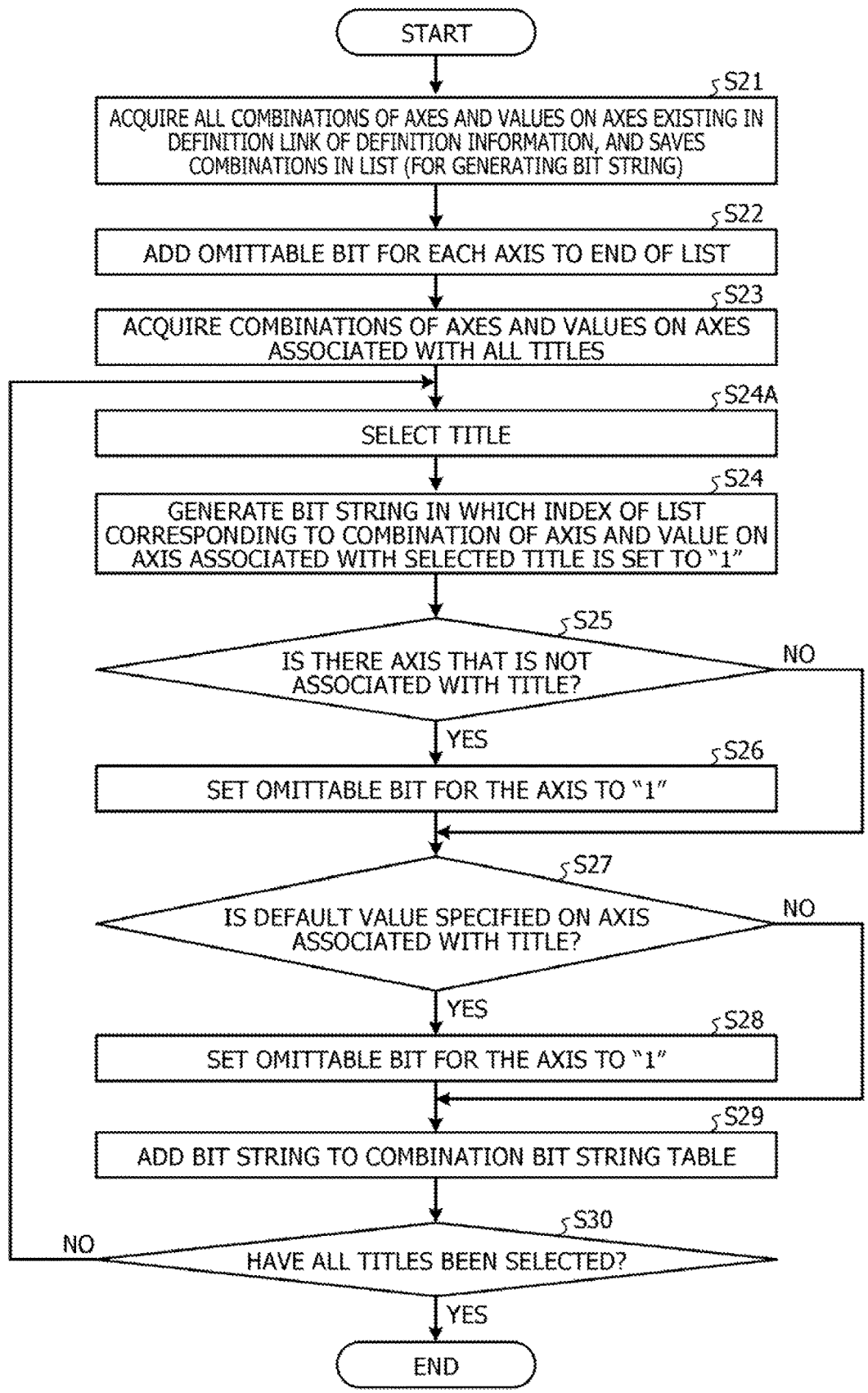
FIG. 8 is a diagram illustrating an example of a flowchart of definition information analysis processing according to the embodiment.

FIG. 8 is a diagram illustrating an example of the flowchart of the definition information analysis processing according to the embodiment.

As illustrated in FIG. 8, the definition information analysis unit 11 acquires all combinations of axes and values on the axes existing in a definition link of the definition information 21, and saves the combinations in a list for generating the verification bit string 24 (Step S21). In addition, the definition information analysis unit 11 adds an omittable bit for each axis to an end of the list (Step S22).

Then, the definition information analysis unit 11 acquires combinations of axes and values on the axes associated with all titles (Step S23).

Then, the definition information analysis unit 11 selects one title from all the titles (Step S24A). The definition information analysis unit 11 generates a bit string in which an index of the list corresponding to a combination of an axis and a value on the axis associated with the selected title is set to "1" (Step S24).

Then, the definition information analysis unit 11 determines whether or not there is an axis that is not associated with (not specified in) the selected title (Step S25). In a case where it is determined that there is an axis that is not associated with (not specified in) the selected title (Step S25; Yes), the definition information analysis unit 11 sets an omittable bit for the axis in the bit string to "1" (Step S26). Then, the definition information analysis unit 11 proceeds to Step S27.

On the other hand, in a case where it is determined that there is no axis that is not associated with (not specified in) the selected title (Step S25; No), the definition information analysis unit 11 proceeds to Step S27.

In Step S27, the definition information analysis unit 11 determines whether or not a default value is specified on the axis associated with the selected title (Step S27). In a case where it is determined that a default value is specified on the axis associated with the selected title (Step S27; Yes), the definition information analysis unit 11 sets an omittable bit for the axis in the bit string to "1" (Step S28). Then, the definition information analysis unit 11 proceeds to Step S29.

On the other hand, in a case where it is determined that a default value is not specified on the axis associated with the selected title (Step S27; No), the definition information analysis unit 11 proceeds to Step S29.

In Step S29, the definition information analysis unit 11 adds the bit string to the combination bit string table 23 (Step S29).

Then, the definition information analysis unit 11 determines whether or not all the titles have been selected (Step S30). In a case where it is determined that all the titles have not been selected (Step S30; No), the definition information analysis unit 11 proceeds to Step S24A to select the next title.

On the other hand, in a case where it is determined that all the titles have been selected (Step S30; Yes), the definition information analysis unit 11 ends the definition information analysis processing.

Flowchart of Verification Information Analysis Processing

Figure 9:
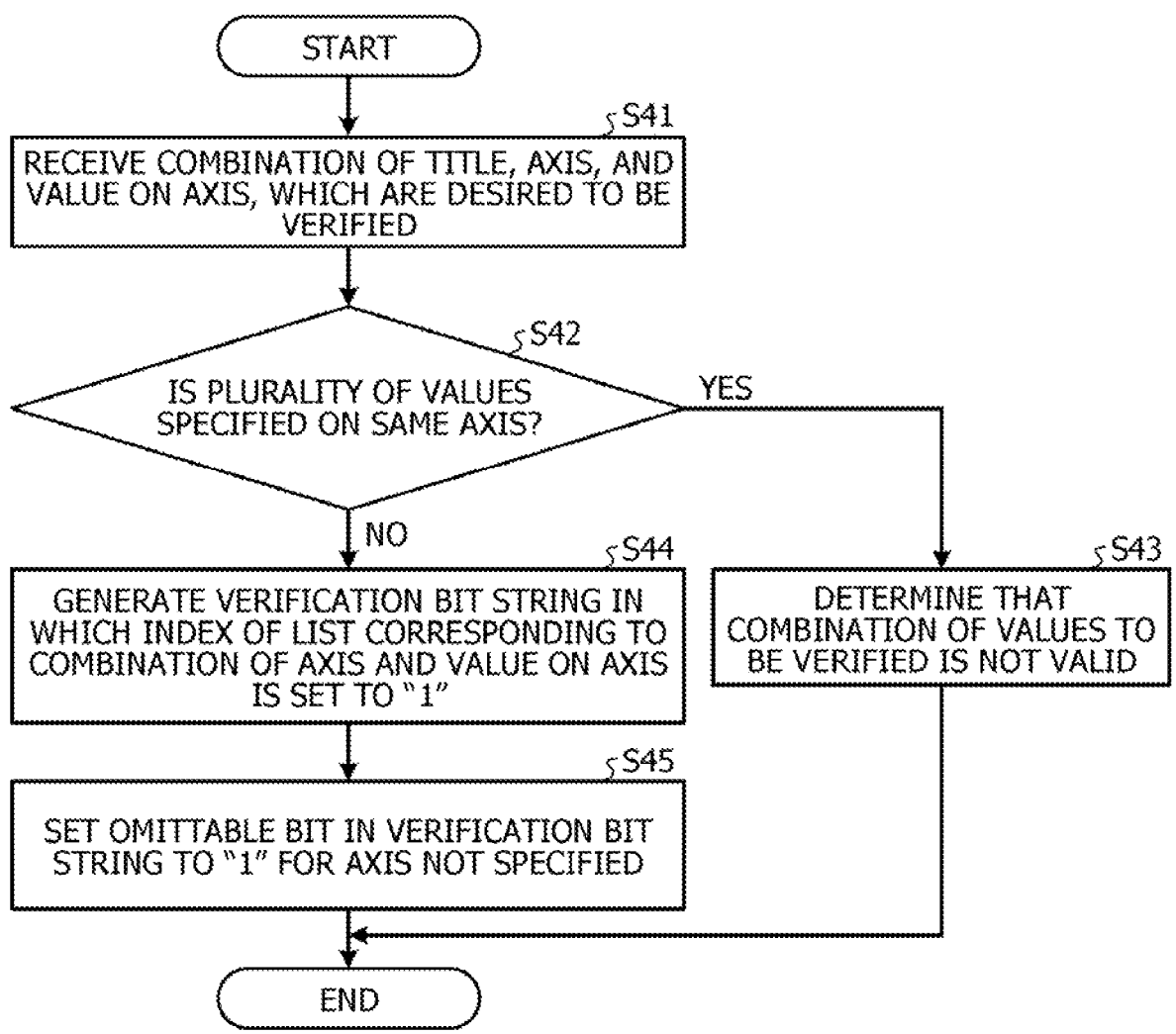
FIG. 9 is a diagram illustrating an example of a flowchart of verification information analysis processing according to the embodiment.

FIG. 9 is a diagram illustrating an example of the flowchart of the verification information analysis processing according to the embodiment.

As illustrated in FIG. 9, the verification information analysis unit 12 receives a combination of a title, an axis, and a value on the axis, which are desired to be verified (Step S41). For example, the verification information analysis unit 12 receives a combination of values to be verified.

Then, the verification information analysis unit 12 determines, for the received combination, whether or not a plurality of values is specified on the same axis (Step S42). In a case where it is determined that a plurality of values is specified on the same axis (Step S42; Yes), the verification information analysis unit 12 determines that the combination of the values to be verified is not valid (Step S43). Then, the verification information analysis unit 12 ends the verification information analysis processing.

On the other hand, in a case where it is determined that a plurality of values is not specified on the same axis (Step S42; No), the verification information analysis unit 12 generates the verification bit string 24 in which an index of the list corresponding to the combination of the axis and the value on the axis is set to "1" (Step S44).

In addition, the verification information analysis unit 12 sets an omittable bit in the verification bit string 24 to "1" for an axis not specified in the received combination (Step S45). Then, the verification information analysis unit 12 ends the verification information analysis processing.

Flowchart of Verification Processing

Figure 10:
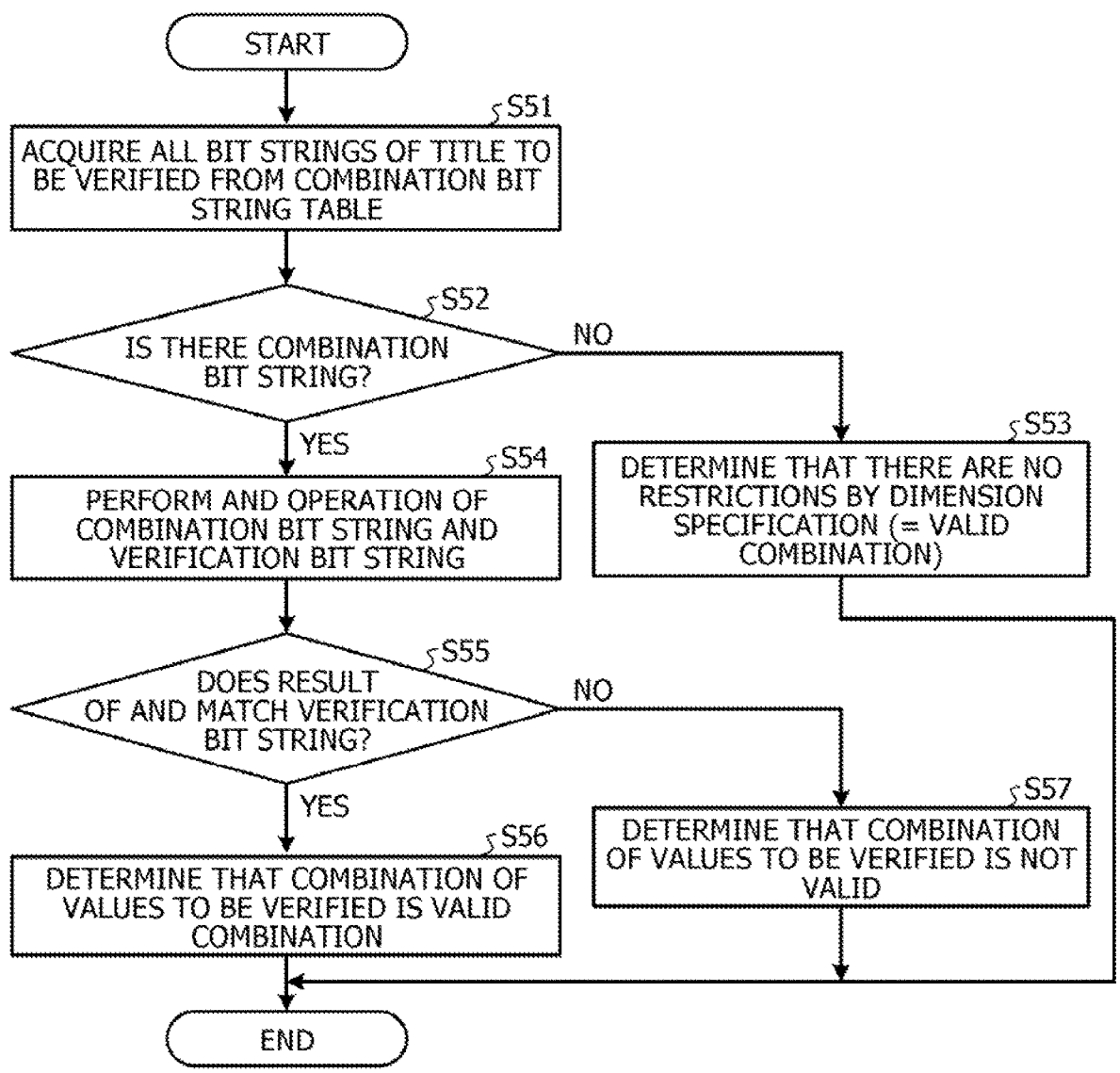
FIG. 10 is a diagram illustrating an example of a flowchart of the verification processing according to the embodiment.

FIG. 10 is a diagram illustrating an example of the flowchart of the verification processing according to the embodiment.

As illustrated in FIG. 10, the verification unit 13 acquires all bit strings of the title to be verified from the combination bit string table 23 (Step S51). The reason for acquiring all the bit strings is that, depending on a title to be verified, even the same title may have a plurality of combination bit strings.

The verification unit 13 determines whether or not there is a combination bit string (Step S52). In a case where it is determined that there is no combination bit string (Step S52; No), the verification unit 13 determines that there are no restrictions by the Dimension specification, and determines that the combination of the values to be verified is a valid combination (Step S53). Then, the verification unit 13 ends the verification processing.

On the other hand, in a case where it is determined that there is a combination bit string (Step S52; Yes), the verification unit 13 performs an AND operation of the combination bit string and the verification bit string 24 (Step S54). Then, the verification unit 13 determines whether or not a result of the AND operation matches the verification bit string 24 (Step S55).

In a case where it is determined that the result of the AND operation matches the verification bit string 24 (Step S55; Yes), the verification unit 13 determines that the combination of the values to be verified is a valid combination (Step S56). Then, the verification unit 13 ends the verification processing.

On the other hand, in a case where it is determined that the result of the AND operation does not match the verification bit string 24 (Step S55; No), the verification unit 13 determines that the combination of the values to be verified is not a valid combination (Step S57). Then, the verification unit 13 ends the verification processing.

With this configuration, the information processing apparatus 1 may perform verification based on the Dimension specification of an instance 22 having a large size at high speed while improving accuracy of the verification. For example, in recent years, the instance 22 reported by using the Dimension specification has increased in size, for example, several hundred megabytes (MB) to several gigabytes (GB). Thus, a financial supervisory authority or the like that has received submission of the instance 22 needs to verify the instance 22 having a large size, submission of which has been received. In such a case, the information processing apparatus 1 may verify combinations of Dimensions of a large number of numerical values in the instance 22 without referring to an XBRL taxonomy (definition information 21).

Furthermore, the information processing apparatus 1 may reliably assign data of the instance 22 at high speed to a table definition in the XBRL taxonomy (definition information 21). For example, the XBRL taxonomy (definition information 21) has a specification for defining a table called a table link base. In a matrix of a header part of each table, a title name, a value that a Dimension may take, and the like are specified. When the information processing apparatus 1 generates the verification bit string 24 of the instance 22 at the time of verification, it is possible to assign data to each table by using the generated verification bit string 24 thereafter. For example, the information processing apparatus 1 may search the instance 22 for data satisfying the Dimension by using the verification bit string 24 for each table, and assign the data to each table.

Effects of Embodiment

According to the embodiment described above, when receiving XBRL data, the information processing apparatus 1 acquires data of an optional title from the XBRL data as data to be verified. The information processing apparatus 1 specifies, with reference to definition information of the XBRL data, attribute values assigned to data of the same title as the data to be verified. The information processing apparatus 1 verifies validity of the data to be verified by using an algorithm that determines that the data to be verified is valid in a case where the specified attribute values are associated with or not associated with the data to be verified, and determines that the data to be verified is not valid in a case where attribute values other than the specified attribute values are associated with the data to be verified. Then, the information processing apparatus 1 determines that the data to be verified is not valid in a case where the specified attribute values include attribute values of a predetermined type, and none of the attribute values of the predetermined type is associated with the data to be verified. According to such a configuration, the information processing apparatus 1 may improve verification accuracy.

Furthermore, according to the embodiment described above, the information processing apparatus 1 acquires data to be verified that imparts verification information that indicates verification is performed to attribute values to be verified of the optional title, and also imparts, as attribute values, information that indicates that omission is not performed to an axis that has an attribute to be verified and information that indicates that omission is performed to an axis of an attribute value not to be verified. The information processing apparatus 1 acquires combination data that imparts combination information that indicates a combination of an axis based on the optional title and an attribute value on the axis, and also imparts, as an attribute value, information that indicates whether or not omission is possible to the axis based on the optional title. The information processing apparatus 1 collates the data to be verified with the combination data by corresponding attribute values, and determines that the data to be verified is not valid in a case where any of the attribute values are not associated with each other. According to such a configuration, the information processing apparatus 1 may improve the verification accuracy by using, for the verification, the information that indicates whether or not omission is possible for the axis.

Furthermore, the information processing apparatus 1 performs a bit operation to collate corresponding attribute values with each other. According to such a configuration, the information processing apparatus 1 may perform the verification with high accuracy and at high speed.

Program and the Like

Note that each illustrated component of the information processing apparatus 1 does not necessarily have to be physically configured as illustrated in the drawings. For example, specific aspects of separation and integration of the information processing apparatus 1 are not limited to the illustrated ones, and all or a part of the information processing apparatus 1 may be functionally or physically separated and integrated in an optional unit according to various loads, use states, or the like. For example, the verification unit 13 and the output unit 14 may be integrated as one unit. On the other hand, the definition information analysis unit 11 may be separated into a first definition information analysis unit that generates a combination part of an axis and a value on the axis in a combination bit string, and a second definition information analysis unit that generates an omittable bit part in the combination bit string. Similarly, the verification information analysis unit 12 may be separated into a first verification information analysis unit that generates a combination part of an axis and a value on the axis in the verification bit string 24, and a second verification information analysis unit that generates an omittable bit part in the verification bit string 24. Furthermore, the storage unit 20 such as the definition information 21, the instance 22, the combination bit string table 23, and the verification bit string 24 may be connected via a network as an external device of the information processing apparatus 1.

Figure 11:
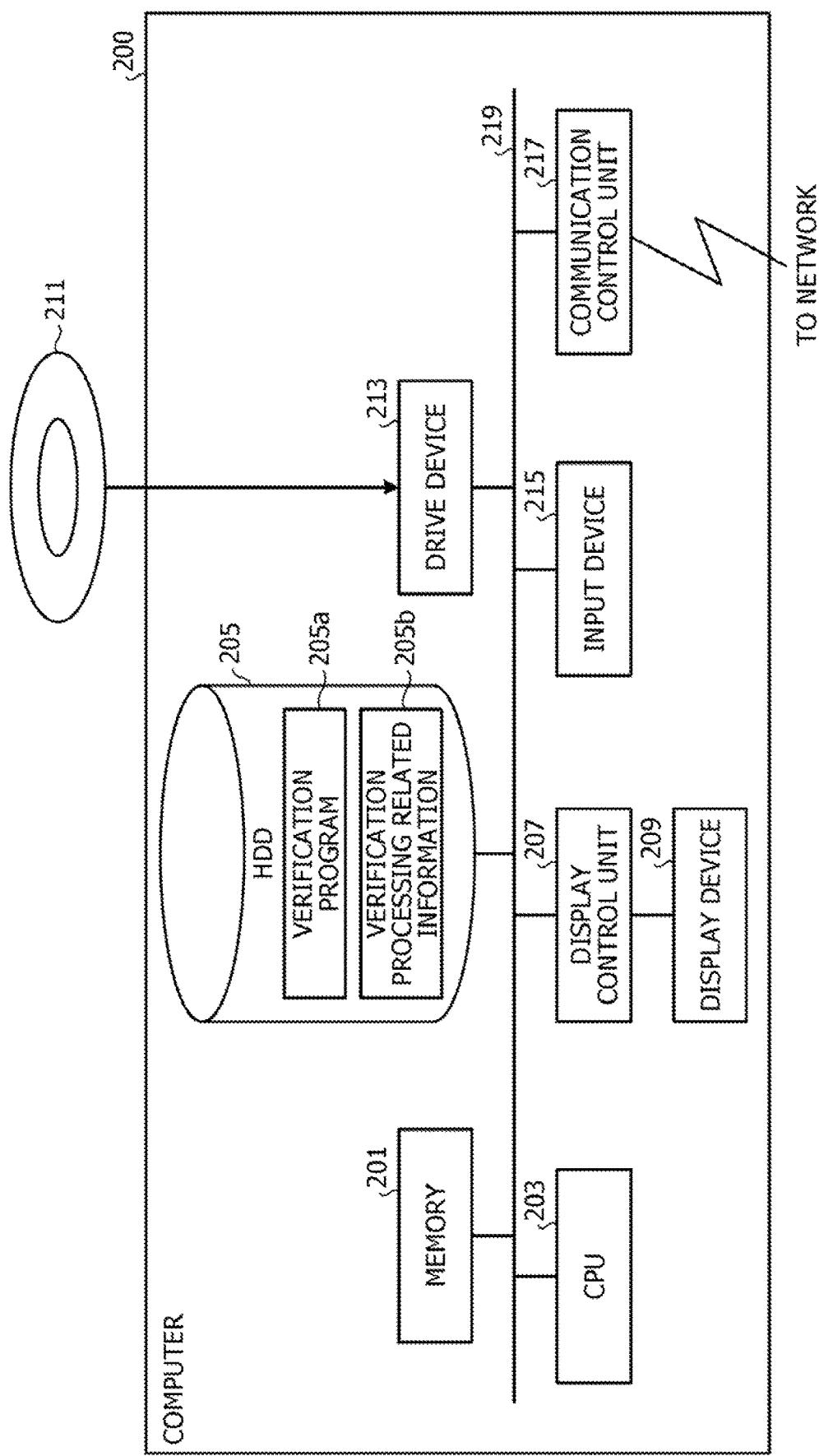
FIG. 11 is a diagram illustrating an example of a computer that executes a verification program.

Furthermore, various types of processing described in the embodiments described above may be implemented by executing a program prepared in advance on a computer such as a personal computer or a workstation. Thus, in the following, an example of a computer that executes a verification program implementing functions similar to those of the information processing apparatus 1 illustrated in FIG. 1 will be described. FIG. 11 is a diagram illustrating an example of the computer that executes the verification program.

As illustrated in FIG. 11, a computer 200 includes a central processing unit (CPU) 203 that executes various types of arithmetic processing, an input device 215 that receives data input from a user, and a display control unit 207 that controls a display device 209. Furthermore, the computer 200 includes a drive device 213 that reads a program or the like from a storage medium, and a communication control unit 217 that exchanges data with another computer via a network. Furthermore, the computer 200 includes a memory 201 that temporarily stores various types of information and a hard disk drive (HDD) 205. In addition, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores a verification program 205a and verification processing related information 205b.

The CPU 203 reads the verification program 205a and develops the verification program 205a in the memory 201. The verification program 205a functions as a verification process.

For example, the verification process corresponds to each functional unit of the control unit 10. The verification processing related information 205b corresponds to the definition information 21, the instance 22, the combination bit string table 23, and the verification bit string 24.

Note that the verification program 205a does not necessarily need to be stored in the HDD 205 from the beginning. For example, the program is stored in a "portable physical medium" such as a flexible disk (FD), a compact disk read only memory (CD-ROM), a digital versatile disk (DVD), a magneto-optical disk, or an integrated circuit (IC) card, which is inserted into the computer 200. Then, the computer 200 may read the verification program 205a from these media and execute the verification program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A verification method implemented by a computer for performing verification based on a Dimension specification, the verification method comprising:

obtaining XBRL (extensible business reporting language) data from a memory of the computer, the XBRL data including, for each account title of one or more account titles, a plurality of pieces of data each of which is associated with any one of a plurality of axes, each of the one or more account titles being associated with one or more axes of the plurality of axes, each of the plurality of axes including a plurality of attributes, each piece of the plurality of pieces of data for the account title being associated with any one of the plurality of attributes included in any one of the plurality of axes;

generating, for a verification target being any one of the one or more account titles, a verification bit string by analyzing verification target data being, among the received XBRL data, the plurality of pieces of data associated with the verification target, the verification bit string including a plurality of first bits corresponding to the plurality of axes, each first bit of the plurality of first bits being set as a value indicating that a corresponding axis of the plurality of axes is omittable in a case where none of the plurality of pieces of data is associated with the corresponding axis, each first bit of the plurality of first bits being set as a value indicating that the corresponding axis is not omittable in a case where at least any one of the plurality of pieces of data is associated with the corresponding axis;

obtaining definition information from the memory of the computer, the definition information including information indicating a definition of a structure of the XBRL data, the definition including, for each account title of the one or more account titles, the one or more axes associated with the account title and the plurality of attributes included in each axis of the one or more axes;

generating a combination bit string table by analyzing the definition information, the combination bit string table including, for each account title of the one or more account titles, a combination bit string that includes a plurality of second bits corresponding to the plurality of axes, each second bit of the plurality of second bits being set as a value indicating that the corresponding axis of the plurality of axes is omittable in a case where the definition included in the definition information does not indicate that the corresponding axis is associated with the account title, each second bit of the plurality of second bits being set as a value indicating that the corresponding axis is omittable in a case where the definition included in the definition information indicates that the corresponding axis is associated with the account title and indicates as a default value any one of the plurality of attributes included in the corresponding axis, each second bit of the plurality of second bits being set as a value indicating that the corresponding axis is not omittable in a case where the definition included in the definition information indicates that the corresponding axis is associated with the account title and indicates as the default value none of the plurality of attributes included in the corresponding axis;

verifying validity of the verification target data by performing a bit operation between the verification bit string and the combination bit string for the verification target among the combination bit string table, the performing of the bit operation including performing an AND operation between the plurality of first bits and the plurality of second bits; and outputting a verification result obtained by the verifying of the validity of the verification target data, the verification result indicating that the verification target data is not valid in a case where a result of the AND operation indicates that the plurality of first bits do not match with the plurality of second bits.

2. An information processing apparatus for performing verification based on a Dimension specification, the information processing apparatus comprising:

a memory; and a processor coupled to the memory, the processor being configured to perform processing, the processing including:

obtaining XBRL (extensible business reporting language) data from a memory of the computer, the XBRL data including, for each account title of one or more account titles, a plurality of pieces of data each of which is associated with any one of a plurality of axes, each of the one or more account titles being associated with one or more axes of the plurality of axes, each of the plurality of axes including a plurality of attributes, each piece of the plurality of pieces of data for the account title being associated with any one of the plurality of attributes included in any one of the plurality of axes;

generating, for a verification target being any one of the one or more account titles, a verification bit string by analyzing verification target data being, among the received XBRL data, the plurality of pieces of data associated with the verification target, the verification bit string including a plurality of first bits corresponding to the plurality of axes, each first bit of the plurality of first bits being set as a value indicating that a corresponding axis of the plurality of axes is omittable in a case where none of the plurality of pieces of data is associated with the corresponding axis, each first bit of the plurality of first bits being set as a value indicating that the corresponding axis is not omittable in a case where at least any one of the plurality of pieces of data is associated with the corresponding axis;

obtaining definition information from the memory of the computer, the definition information including information indicating a definition of a structure of the XBRL data, the definition including, for each account title of the one or more account titles, the one or more axes associated with the account title and the plurality of attributes included in each axis of the one or more axes;

generating a combination bit string table by analyzing the definition information, the combination bit string table including, for each account title of the one or more account titles, a combination bit string that includes a plurality of second bits corresponding to the plurality of axes, each second bit of the plurality of second bits being set as a value indicating that the corresponding axis of the plurality of axes is omittable in a case where the definition included in the definition information does not indicate that the corresponding axis is associated with the account title, each second bit of the plurality of second bits being set as a value indicating that the corresponding axis is omittable in a case where the definition included in the definition information indicates that the corresponding axis is associated with the account title and indicates as a default value any one of the plurality of attributes included in the corresponding axis, each second bit of the plurality of second bits being set as a value indicating that the corresponding axis is not omittable in a case where the definition included in the definition information indicates that the corresponding axis is associated with the account title and indicates as the default value none of the plurality of attributes included in the corresponding axis;

verifying validity of the verification target data by performing a bit operation between the verification bit string and the combination bit string for the verification target among the combination bit string table, the performing of the bit operation including performing an AND operation between the plurality of first bits and the plurality of second bits; and outputting a verification result obtained by the verifying of the validity of the verification target data, the verification result indicating that the verification target data is not valid in a case where a result of the AND operation indicates that the plurality of first bits do not match with the plurality of second bits.

3. A non-transitory computer-readable storage medium storing a verification program for causing a computer for performing verification based on a Dimension specification to perform processing, the processing comprising:

obtaining XBRL (extensible business reporting language) data from a memory of the computer, the XBRL data including, for each account title of one or more account titles, a plurality of pieces of data each of which is associated with any one of a plurality of axes, each of the one or more account titles being associated with one or more axes of the plurality of axes, each of the plurality of axes including a plurality of attributes, each piece of the plurality of pieces of data for the account title being associated with any one of the plurality of attributes included in any one of the plurality of axes;

generating, for a verification target being any one of the one or more account titles, a verification bit string by analyzing verification target data being, among the received XBRL data, the plurality of pieces of data associated with the verification target, the verification bit string including a plurality of first bits corresponding to the plurality of axes, each first bit of the plurality of first bits being set as a value indicating that a corresponding axis of the plurality of axes is omittable in a case where none of the plurality of pieces of data is associated with the corresponding axis, each first bit of the plurality of first bits being set as a value indicating that the corresponding axis is not omittable in a case where at least any one of the plurality of pieces of data is associated with the corresponding axis;

obtaining definition information from the memory of the computer, the definition information including information indicating a definition of a structure of the XBRL data, the definition including, for each account title of the one or more account titles, the one or more axes associated with the account title and the plurality of attributes included in each axis of the one or more axes;

generating a combination bit string table by analyzing the definition information, the combination bit string table including, for each account title of the one or more account titles, a combination bit string that includes a plurality of second bits corresponding to the plurality of axes, each second bit of the plurality of second bits being set as a value indicating that the corresponding axis of the plurality of axes is omittable in a case where the definition included in the definition information does not indicate that the corresponding axis is associated with the account title, each second bit of the plurality of second bits being set as a value indicating that the corresponding axis is omittable in a case where the definition included in the definition information indicates that the corresponding axis is associated with the account title and indicates as a default value any one of the plurality of attributes included in the corresponding axis, each second bit of the plurality of second bits being set as a value indicating that the corresponding axis is not omittable in a case where the definition included in the definition information indicates that the corresponding axis is associated with the account title and indicates as the default value none of the plurality of attributes included in the corresponding axis;

verifying validity of the verification target data by performing a bit operation between the verification bit string and the combination bit string for the verification target among the combination bit string table, the performing of the bit operation including performing an AND operation between the plurality of first bits and the plurality of second bits; and outputting a verification result obtained by the verifying of the validity of the verification target data, the verification result indicating that the verification target data is not valid in a case where a result of the AND operation indicates that the plurality of first bits do not match with the plurality of second bits.

* * * * *